(12) United States Patent
Tachibana (10) Patent No.: US 6,226,048 B1
(45) Date of Patent: May 1, 2001

(54) IMAGE SIGNAL PROCESSING APPARATUS HAVING A SIGNAL LEVEL CORRECTOR CIRCUIT

(75) Inventor: Naotaka Tachibana, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/068,600

(22) PCT Filed: Sep. 12, 1997

(86) PCT No.: PCT/JP97/03237

§ 371 Date: May 11, 1998

§ 102(e) Date: May 11, 1998

(87) PCT Pub. No.: WO98/11735

PCT Pub. Date: Mar. 19, 1998

(30) Foreign Application Priority Data

Sep. 12, 1996 (JP) ..................................................... 8-263584

(51) Int. Cl.[7] ................................. H04N 9/74; H04N 9/75
(52) U.S. Cl. ........................... 348/590; 348/591; 348/592
(58) Field of Search ................................... 348/578, 584, 348/585, 587, 590, 591, 592, 593, 597; H04N 9/74, 9/75

(56) References Cited

U.S. PATENT DOCUMENTS 5,903,318 * 5/1999 Demay ................................. 348/592

FOREIGN PATENT DOCUMENTS

| 60-50109 | 11/1985 | (JP) . |
| 63-6199 | 2/1988 | (JP) . |
| 63-246091 | 10/1988 | (JP) . |
| 5-27312 | 4/1993 | (JP) . |
| 5-83725 | 4/1993 | (JP) . |
| 7-7739 | 1/1995 | (JP) . |
| 7-203471 | 8/1995 | (JP) . |
| 8-191458 | 7/1996 | (JP) . |

* cited by examiner

Primary Examiner—Sherrie Hsia
(74) Attorney, Agent, or Firm—Frommer Lawrence & Haug, LLP.; William S. Frommer; Joe H. Shallenburger (57) ABSTRACT

An image signal processing apparatus is provided and includes a YC separator circuit for extracting a chrominance signal from an image signal, a signal level detector circuit for outputting a signal level detecting signal by detecting a signal level of the chrominance signal and a signal level corrector circuit for correcting a signal level of the signal level detecting signal to generate a key signal according to the chrominance signal, the signal level corrector circuit including an oversampler circuit.

6 Claims, 9 Drawing Sheets

IMAGE SIGNAL PROCESSING APPARATUS HAVING A SIGNAL LEVEL CORRECTOR CIRCUIT

TECHNICAL FIELD

The present Invention relates to an image signal processing apparatus suitably applicable, for example, to an editing system and particularly to composing image signals by generating a key signal with reference to a signal level for a chrominance signal without causing an incongruous feeling even if a picture having little luminance signal component is processed.

BACKGROUND ART

In the editing system, it has been a conventional practice to make various processing for image signals by the key signal which is generated with reference to the luminance signal as a standard.

Figure 14A:
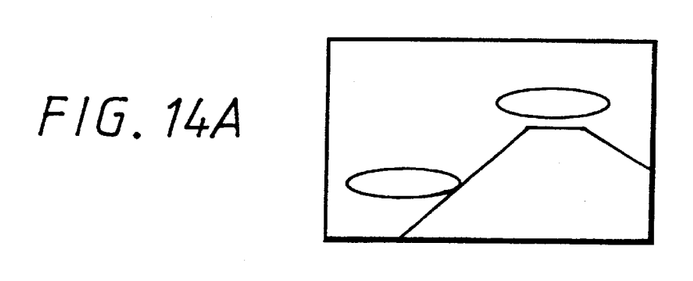
FIGS. 14A–14C are schematic diagrams serving for explanation of processing an image signal using the conventional key signal.

Specifically, the editing system of this type extracts the luminance signal form an image signal which is an object of processing and makes the gain of the luminance signal variable after clamping it to generate the key signal. Further, with reference to the key signal, an image signal of background and the image signal to be processed are mixed each other, thereby causing the image as the object of processing (see FIG. 14B) to be fit into the image of background (see FIG. 14A) for producing a composed image (see FIG. 14C), for example.

In the meantime, the editing system may generate the key signal taking an image signal produced by the computer graphics as the object of processing. In such an image signal as produced by the computer graphics, there may sometimes be included a picture of blue color, etc. having little luminance signal components.

If the key signal is generated with the luminance signal as a standard in connection with the picture of blue color, etc. having little luminance components, the key signal will be generated in thinner form. Consequently, when processing the picture produced by the computer graphics by the key signal, the edition processed picture will be displayed played in the thinner shape. This will make the edited picture to cause a sense of incongruity.

Figure 14B:
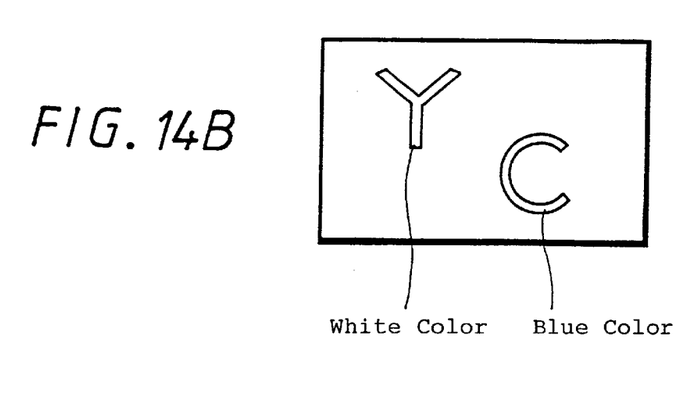
Figure 14C:
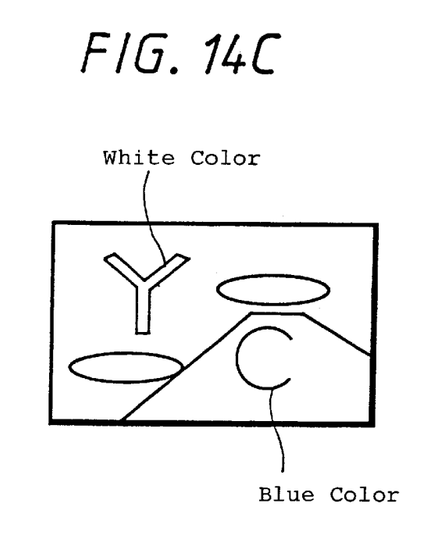

Thus, when letters of Y and C in FIG. 14B are displayed in white and blue, respectively, there is an inconvenience that, as is shown in FIG. 14C, the letter C will be composed to be thinner than the letter Y in the composed picture.

DISCLOSURE OF INVENTION

The present invention has been made in consideration of the foregoing point and aims to propose an image signal processing apparatus which is capable an image signal without causing the incongruous feeling even if the picture having little luminance signal component is processed.

The present invention comprises a signal level detector circuit for outputting a signal level detecting signal by detecting a signal level a the chrominance signal and a signal level corrector circuit for correcting a signal level of the signal level detecting signal to generate a key signal according to the chrominance signal.

If the signal level detecting signal is obtained by detecting the signal level of the chrominance signal and the key signal is then generated with reference to the chrominance signal from the signal level detecting signal, it will be possible to raise the signal level of the key signal for an area where the luminance signal is low level, thereby allowing the picture composition to be performed satisfactorily on such area.

BEST MODE FOR CARRYING OUT THE INVENTION

Now, the embodiments according to the present invention will be described in detail below with reference to accompanying drawings.

(1) The First Embodiment

Figure 2:
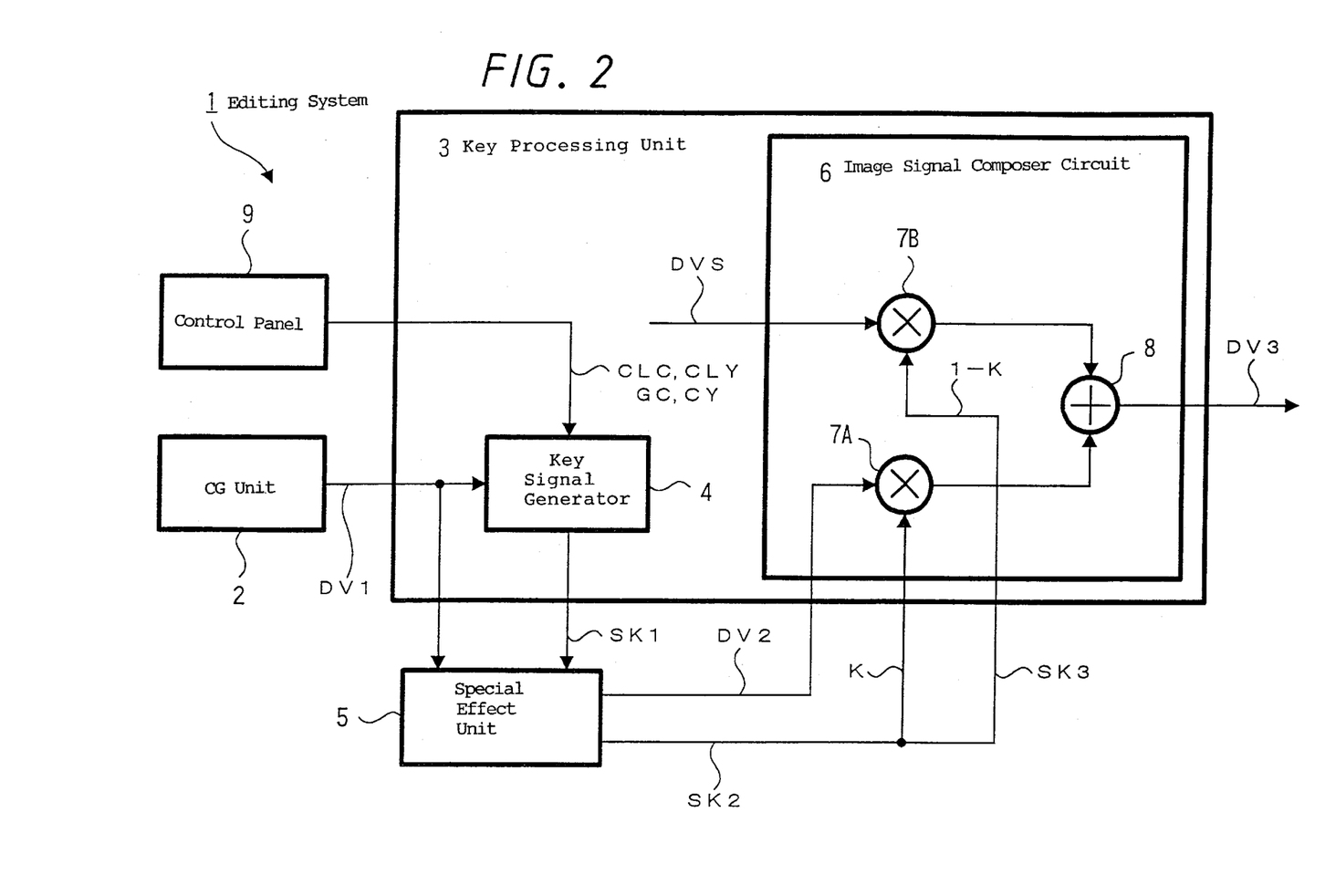
FIG. 2 is a block diagram showing a whole configuration of the editing system.

FIG. 2 is a block diagram showing the editing system according to the first embodiment of the present invention. The editing system 1 causes a three-dimensional variation to a picture produced by a computer graphics (CG) unit 2 and then fits it into a predetermined background for outputting the same.

The computer graphics unit 2 outputs a digital video signal DV1 which is to be processed by the editing system 1 and a key processing unit 3 generates a key signal SK1 from the digital video signal DV1 by a key signal generator circuit 4 in the unit.

A special effect unit 5 receives the digital video signal DV1 and the key signal SK1, and outputs a digital video signal DV2 which is produced by causing the three-dimensional variation to the picture formed by the digital video signal DV1 as well as a key signal SK2 which is generated by causing the same variation.

In the key processing unit 3, an image signal composer circuit 6 receives the digital video signal DV2 at its multiplier circuit 7A and weights it by the key signal SK2. The image signal composer circuit 6 also receives a digital video signal DVS forming the background and weights it by a key signal SK3 whose signal level varies in a complementary manner to the key signal SK2. In addition, the key signal SK3 is generated in the key processing unit 3 with the key signal SK2 as a standard. The image signal composer circuit 6 adds by an adder circuit 8 these signals outputs from the multiplier circuits 7A and 7B, and outputs a composed digital video signal DV3.

In the editing system 1, the digital video signals DV2 and DVS are weighted by respective weighting coefficients K and (1−K), and then added to be composed. By varying the signal level of the key signal SK1 generated by the key signal generator circuit 4 and then varying values of those weighting coefficients K and (1−K) in a complementary manner, the picture produced by the computer graphics unit 2 will be fit into the background formed by the digital video signal DVS.

A control panel 9 controls entire operation of the editing system 1 and sets clipping levels CLC, CLY and multiplying values GC, GY to the key signal generator circuit 4 for generating the key signal to the key signal generator circuit 4 in response to user's operation.

Figure 1:
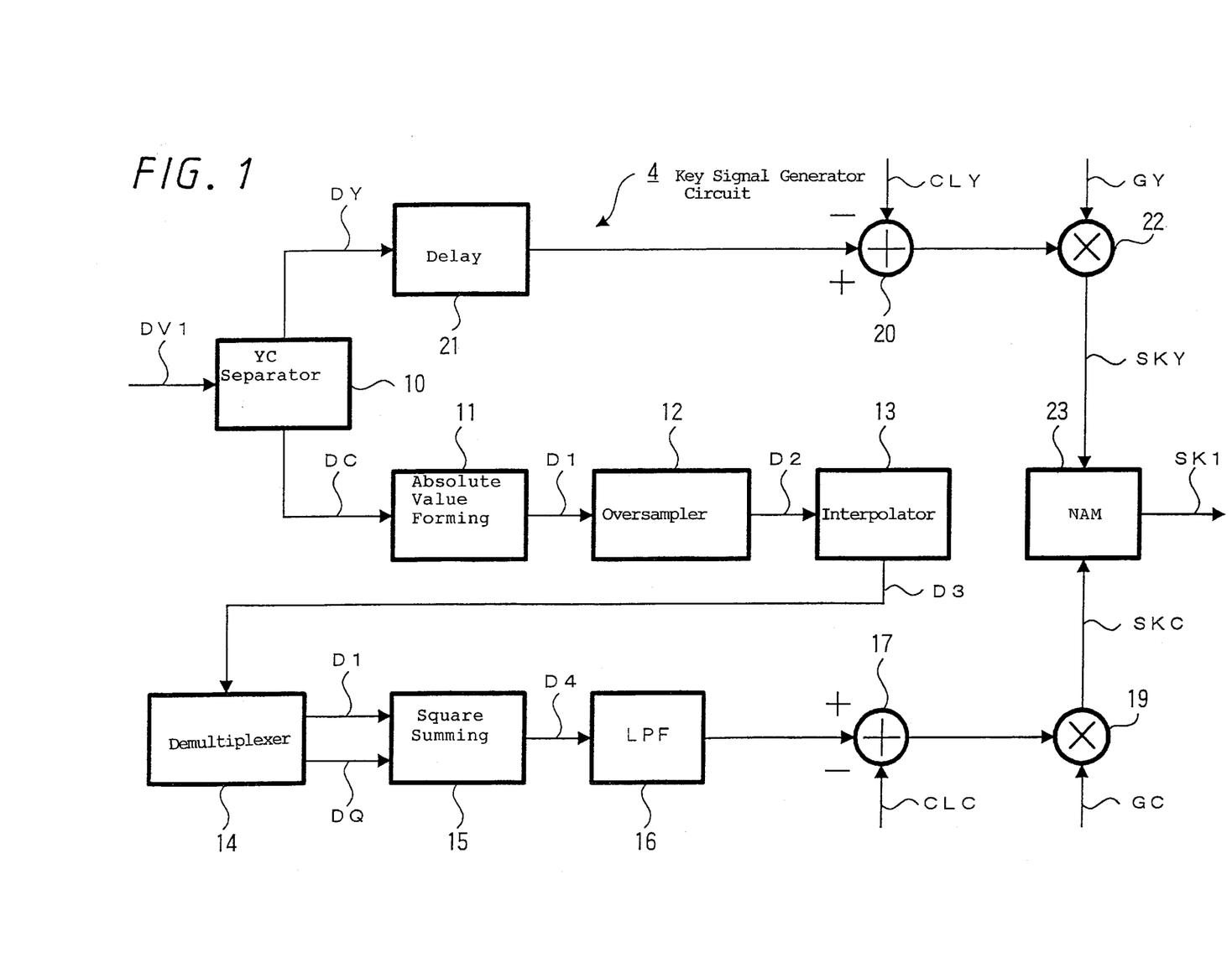
FIG. 1 is a block diagram showing a key signal generator circuit of the editing system according to a first embodiment of the present invention.

FIG. 1 is a block diagram showing the key signal generator circuit 4. The key signal generator circuit 4 inputs the digital video signal DVI to its YC separator circuit 10. In this case, the YC separator circuit 10 is made of a three-dimensional filter, which separates the digital video signal DV1 into a digital luminance signal DY and a digital chrominance signal DC and then outputs the same.

Figure 3:
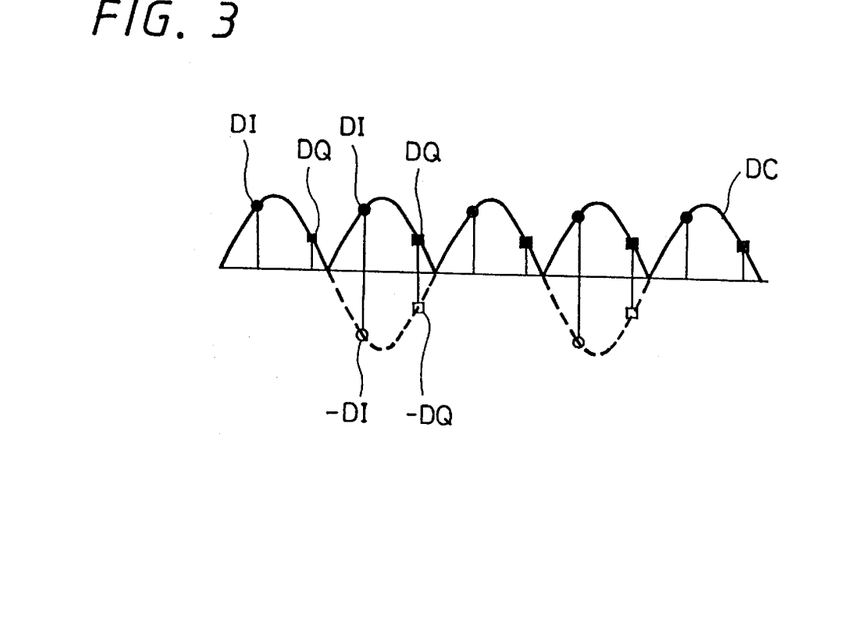
FIG. 3 is a signal wave form diagram serving for explanation of forming an absolute value of a digital chrominance signal.

In the digital video signal DV1, the sampling frequency is set to be a frequency 4 fsc four times the carrier frequency fsc of the chrominance signal. As is shown in FIG. 3, the digital chrominance signal output from the YC separator circuit 10 is produced by sampling the chrominance signal at the sampling time with reference to the I axis and the Q axis, so that the signal is comprised of alternately repeating data DI, −DI, DI, −DI, . . . and DQ, −DQ, DQ, −DQ, . . . which correspond to the I signal and the Q signal, respectively.

Figure 4A:
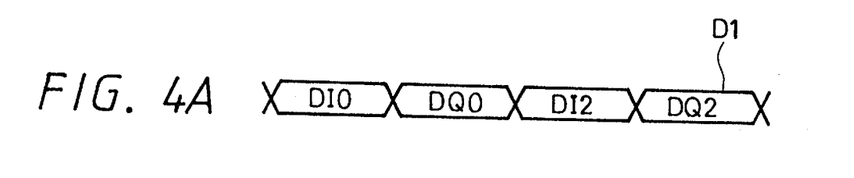
FIG. 4 is a time chart serving for explanation of oversampling I signal data and Q signal data.

An absolute value forming circuit 11 forms absolute values of the digital chrominance signal DC. In other words, the absolute value forming circuit 11 converts the I signal component and the Q signal component of the digital chrominance signal DC to the base band, and outputs, as shown in FIG. 4, IQ signal data D1 (FIG. 4A) which is comprised of alternately repeating I signal data DI0, DI2, . . . and Q signal data DQ0, DQ2, . . . .

Figure 4B:
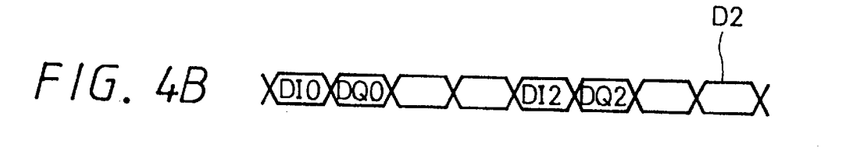

An oversampler circuit 12 receives the IQ signal data D1 output from the absolute value forming circuit 11 and outputs this IQ signal data D1 through a clock of double frequency. At this time, the oversampler circuit 12 changes the data sequence in such a manner that, after two meaningless data continue, a set of corresponding I signal data and Q signal data will continue for outputting (FIG. 4B).

Figure 4C:
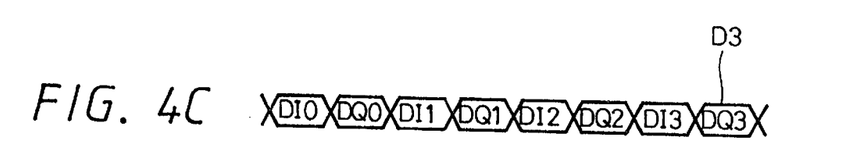

An interpolator circuit 13 receives the output data D2 of the oversampler circuit 12 and replaces those meaningless data interposed among the output data D2 with data DI1, DQ1, DI3, DQ3, . . . which are interpolating operation processed, for outputting (FIG. 4C).

In this interpolation processing, the interpolator circuit 13 performs the interpolating operation processing according to the following equations to which the Lagrange's interpolation formula is applied.

$$DI(2n-1) = -\frac{1}{16}DI2(n-2) + \frac{9}{16}DI2(n-1) + \frac{9}{16}DI2n - \frac{1}{16}DI(2n+1) \quad (1)$$

$$DQ(2n-1) = -\frac{1}{16}DQ2(n-2) + \frac{9}{16}DI2(n-1) + \frac{9}{16}DQ2n - \frac{1}{16}DQ(2n+1) \quad (2)$$

Figure 5A:
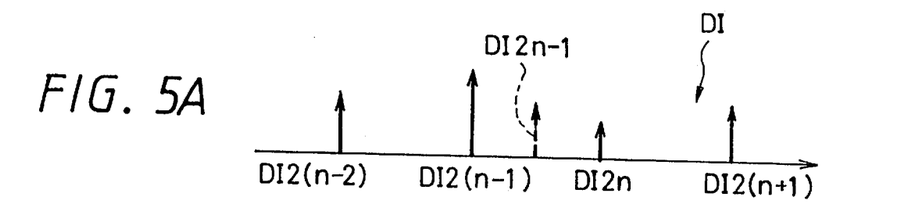
FIG. 5 is a time chart serving for explanation of an interpolation processing of the I signal data and the Q signal data.
Figure 5B:
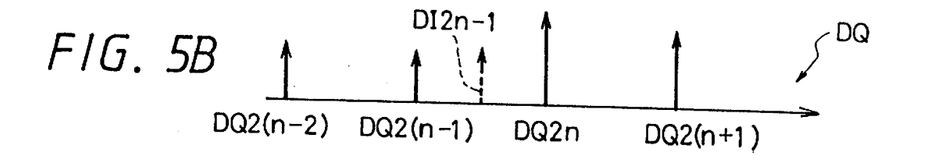

Thus, as is shown in FIGS. 5A and 5B, the interpolator circuit 13 produces from four successive sampled I signal data DI2(n−2), DI2(n−1), DI2n, DI2(n+1) an I signal data DI2n−1 which is positioned at an intermediate among these four samples (FIG. 5A). Likewise, it produces from four successive sampled Q signal data DQ2(n−2), DQ2(n−1), DQ2n, DQ2(n+1) an Q signal data DQ 2n−1 which is positioned at an intermediate among these four samples (FIG. 5B).

Figure 6A:
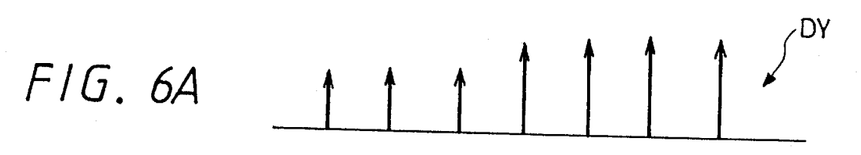
FIG. 6 is a time chart showing a relation between the I signal data, the signal data and the digital luminance signal.
Figure 6B:
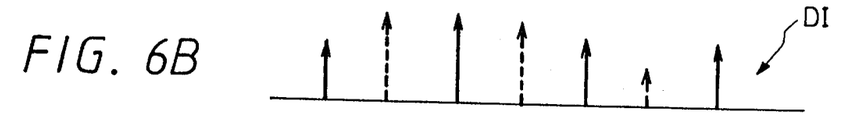
Figure 6C:
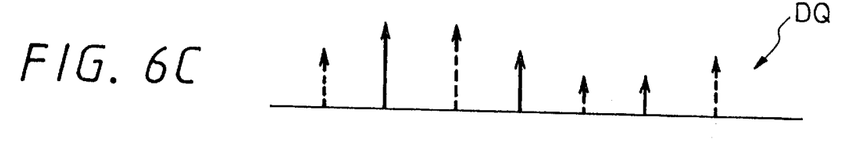

A demultiplexer 14 receives the output data of the interpolator circuit 13 and separates them into the I signal data DI and the Q signal data DQ for outputting simultaneously in parallel. Thus, as is shown in FIG. 6A–6C, the oversampler circuit 12, the interpolator circuit 13 and the demultiplexer 14 interpose the interpolating operation processed data (shown by dotted lines) (FIGS. 6B and 6C) among the original I signal data and Q signal data, and produce I signal data DI and Q signal data DQ in which the sampling rate coincides with the sampling frequency 4 fsc of the digital luminance signal DY (FIG. 6A). At this time, by applying the Lagrange's interpolation operating formula to produce the interposing data, lack of high frequency component is effectively avoided to restore the I signal component and the Q signal component faithfully.

Figure 7:
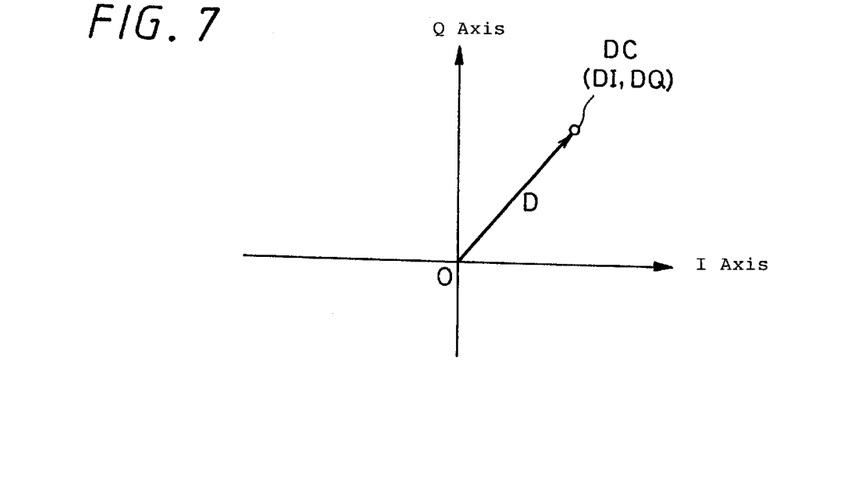
FIG. 7 is a characteristic curve diagram serving for explanation of detecting a scaler amount of the I signal data and Q signal data.

A square summing circuit 15 receives the I signal data DI and the Q signal data DQ outputted from the demultiplexer 14 and performs and operation processing according to the following equation $$D4=(DI^2+DQ^2)^{1/2} \quad (3)$$

for detecting a scaler amount D of the digital chrominance signal, as shown in FIG. 7, namely, a distance D from a reference point which is the origin O of the I axis and the Q axis being reference axes of the I signal and the Q signal.

A low pass filter (LPF) 16 removes an alias distortion component from the output data D4 of the square summing circuit 15 for outputting. A clipper circuit 17 subtracts the clipping level CLC output by the control panel 9 from the output data of the low pass filter (LPF) 16 for outputting. Thus, the clipper circuit 17 sets a slice level for generating the key signal SKC by the clipping level CLC.

A multiplier circuit 19 weights the output data of the clipper circuit 17 by the multiplying value GC output by the control panel 9 and outputs the output data of the clipping circuit 17, for example, with 0 to 100[%] amplitude of the digital video signal. Thus, the multiplier circuit 19 outputs the key signal SKC according to the chrominance signal with the distance D from the origin O of the I axis and the Q axis as a standard.

In this way, the absolute value forming circuit 11 and the square summing circuit 15 form the signal level detector circuit for detecting the signal level of the chrominance signal. The multiplier circuit 19 and the clipper circuit 17 form the signal level correcting means for generating the key signal SKC according to the chrominance signal by correcting the output signal level of the signal level detector circuit.

A clipper circuit 20 receives the digital luminance signal DY from the YC separator circuit 10 through a delay circuit 21 and subtracts the predetermined clipping level CLY therefrom to output it. Thus, the clipper circuit 20 sets the slice level for generating the key signal SKY with reference to the luminance signal by the clipping level CLY.

A multiplier circuit 22 weights the output data of the clipper circuit 20 by the multiplying value GY and output the output data for the clipper circuit 20, for example, with 0 to 100[%] amplitude of the digital video signal. Thus, the multiplier circuit 22 outputs the key signal SKY according to the luminance signal with the amplitude of the luminance signal as a standard.

The delay circuit 21 delays the digital luminance signal DY output by the YC separator circuit 10 to output it, so that the output data of the multiplier circuit 22 may be output at a corresponding time to the output data of the multiplier circuit 19.

A NAM circuit 23 compares sequentially two output data SKC and SKY of the respective multiplier circuit 19 and 22, and selects the output data SKC or SKY with greater signal level to select and output it as the key signal SK1.

The multiplier circuit 22 and the clipper circuit 20 form a luminance signal processing circuit for generating the key signal SKY according to the luminance signal with the luminance signal as a standard. The NAM circuit 23 forms a key signal composer circuit for composing the key signal SKY according to the chrominance signal and the key signal SKC according to the chrominance signal and the outputs the composed key signal SK1.

In the above configuration, the digital video signal DV1 output from the computer graphics unit 2 (FIG. 2) is input to the key signal generator circuit 4 where the key signal SK1 is generated.

In this key signal generator circuit 4 (FIG. 1), the digital video signal DV1 is separated into the digital luminance signal DY and the digital chrominance signal DC by the YC separator circuit 10 and then the digital chrominance signal DC is converted to the base band through being made as the absolute value by the absolute value forming circuit 11, thereby making the I signal and the Q signal to be demodulated.

I signal data and Q signal data D1 comprised of these I signal and Q signal is interpolating operation processed through the oversampler circuit 12 and the interpolator circuit 13, and the respective I signal data and the Q signal data are converted to the data whose sampling rate corresponds to that of the digital luminance signal DY.

In the interpolator circuit 13, the I signal data and Q signal data D1 is interpolating operation processed according to the Lagrange's interpolation formula, thereby causing the deterioration of high frequency component to effectively be avoided and causing the I signal component and the Q signal component to be reproduced faithfully. thereafter, these I signal data and Q signal data are separated by the demultiplexer 14 and then the distance from the origin of the I axis and the Q axis is detected in the following square summing circuit 15, thereby making the signal level of the digital chrominance signal DC to be detected from the scaler with these I axis and Q axis as a standard.

After the alias component is removed from the detected result of the square summing circuit 15 through the low pass filter 16, its signal level is corrected by the clipper circuit 17 and the multiplier circuit 19 for generating the key signal SKC according to the chrominance signal.

In contrast, regarding the digital luminance signal DY, after the processing time is corrected by the delay circuit 21 correspondingly to that of the digital chrominance signal DC, its signal level is corrected by the clipper circuit 20 and the multiplier circuit 22 for generating the key signal SKY according to the luminance signal.

Between the key signal SKY according to the luminance signal and the key signal SKC according to the chrominance signal which are generated in this manner, the NAM circuit 23 selects one of these signals with a greater signal level and also composes them, thus making the key signal SK1 to be generated.

This key signal SK1 is supplied to the special effect unit 5 together with the digital video signal DV1 and is subjected to the variation. Thereafter, it is used in the image signal composer circuit 6 for composing the background digital video signal DVS and the digital video signal DV2.

Figure 8A:
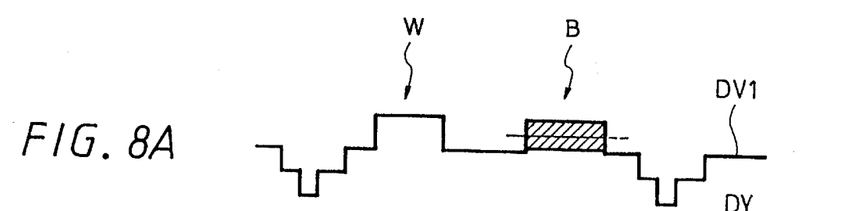
FIG. 8 is a signal wave form diagram serving for explanation of generating the key signal with the key signal according to the luminance signal and the key signal according to the chrominance signal.
Figures 8B, 8C:
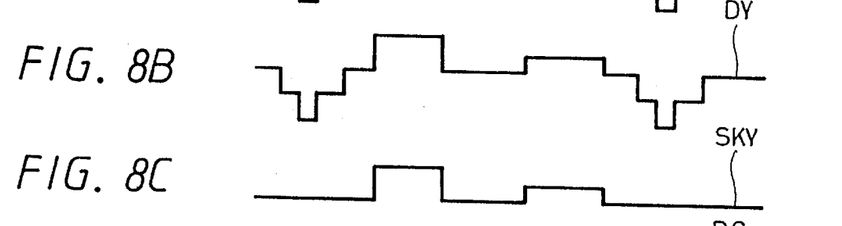
Figure 8D:
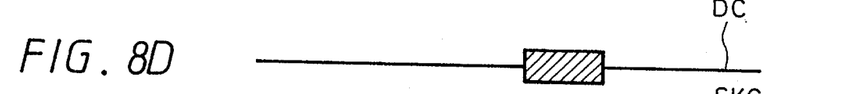
Figure 8E:
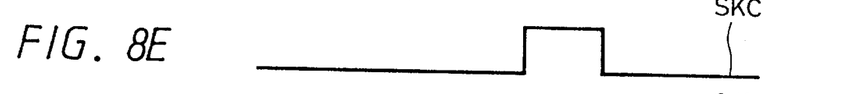
Figure 8F:
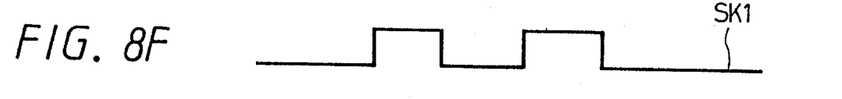
Figure 9A:
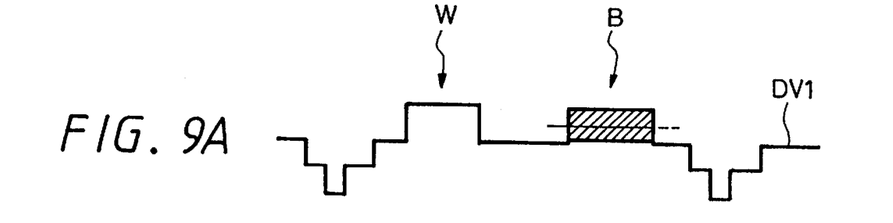
FIG. 9 is a wave form diagram serving for explanation of generating the key signal with only the key signal according to the luminance signal.
Figure 9B:
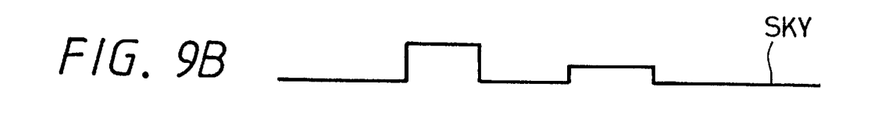
Figure 9C:
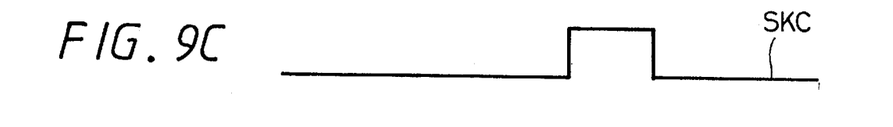
Figure 9D:
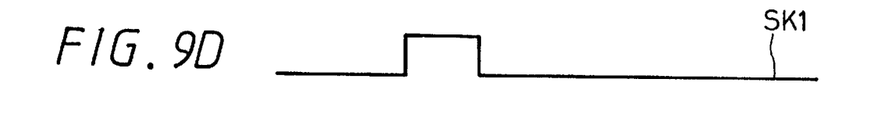
Figure 10A:
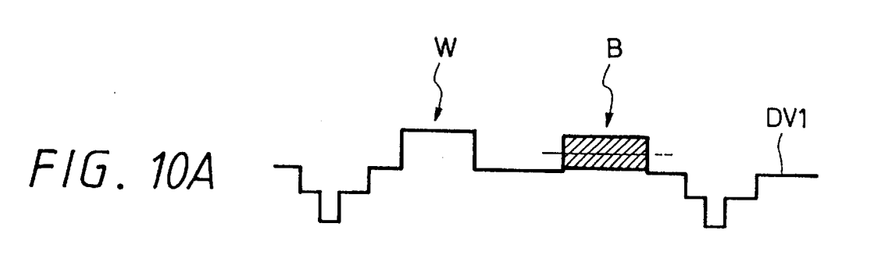
FIG. 10 is a signal wave form diagram serving for explanation of generating the key signal with only the key signal according to the chrominance signal.
Figure 10B:
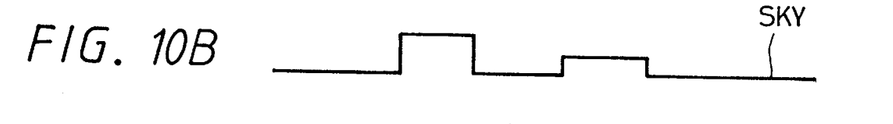
Figure 10C:
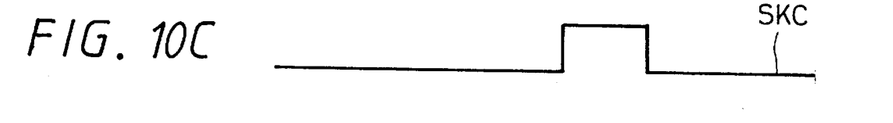
Figure 10D:
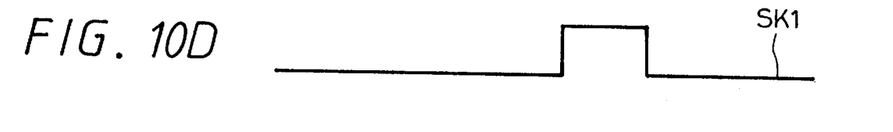

At that time, the clipping levels CLC and CLY of the respective clipper circuits 17 and 20 as well as the multiplying values GC and GY of the respective multiplier circuits 19 and 22 are set up by operating the control panel. Accordingly, as is shown in FIGS. 8A–8F, when processing the digital video signal DV1 including a white portion W and a blue portion B (FIG. 8A), the key signal SKY according to the luminance signal (FIG. 8C) whose signal level varies depending on the luminance signal level can be generated from the digital luminance signal DY (FIG. 8B), whereas the key signal SKC according to the chrominance signal (FIG. 8E) whose signal level rises at the blue portion B including little luminance signal component can be generated from the digital chrominance signal (FIG. 8D).

Therefore, it is possible to generate the key signal SK1 (FIG. 8F) which can punch out both the white portion W and the blue portion B in the same way, from both of the key signals SKY and SKC. Consequently, it is possible to effectively avoid the thinning of the blue portion and compose the image signal free of the sense of incongruity even when processing the picture with little luminance signal component.

Moreover, as is shown in FIGS. 9A–9D, when processing the digital video signal DV1 (FIG. 9A) by making the weighting coefficient GC in the multiplier circuit 19 extremely small, it is possible to generate the key signal SK1 (FIG. 9D) with the luminance signal as a standard similar to the prior art from the key signal SKY according to the luminance signal (FIG. 9B) and the key signal SKC according to the chrominance signal (FIG. 9C), which enables the edition processing as before to be carried out.

On the contrary, as shown in FIGS. 10A–10D, when processing the digital video signal DV1 (FIG. 10A) by making the weighting co efficient GY in the multiplier circuit 22 extremely small, it impossible to generate the key signal SK1 (FIG. 10D) with the chrominance signal as a standard from the key signal SKY according to the luminance signal (FIG. 10B) and the key signal SKC according to the chrominance signal (FIG. 10C), thereby enabling the composed picture by the key signal SK1 to be given different effects from conventional ones.

According to the above configuration, by generating the key signal of the chrominance signal from the signal level of the chrominance signal, it is possible to effectively avoid the thinning of the picture with little luminance signal component, thereby allowing the image signal without the incongruous feeling to be composed even when processing the picture having little luminance signal component.

Furthermore, by composing the key signal according to the chrominance signal and the key signal according to the luminance signal for use, it is possible not only to carry out the edition processing as before, but also to give various effects differing the past ones using preferentially the key signal according to the chrominance signal.

(2) The Second Embodiment

Figure 11:
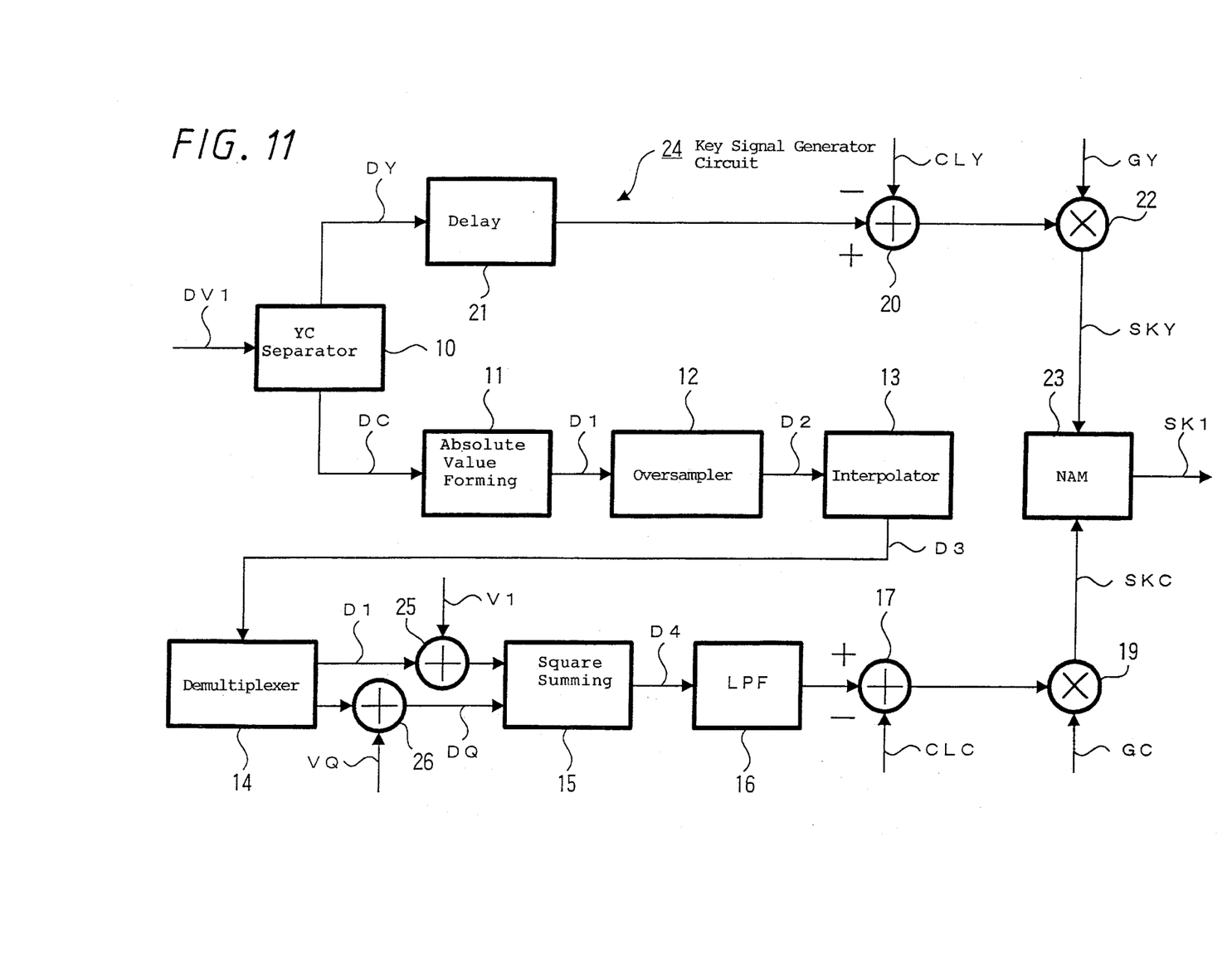
FIG. 11 is a block diagram showing a key signal generator circuit of the editing system according to a second embodiment of the present invention.

FIG. 11 is a block diagram showing a key signal generator circuit applicable to the edition system according to a second embodiment of the present invention. This key signal generator circuit 24 is applied thereto in place of the key signal generator circuit 4 described referring to FIG. 2. Further, in the key signal generator circuit 24, common elements with the key signal generator circuit 4 according to the first embodiment are denoted by the corresponding reference numerals and so a redundant description is omitted.

The key signal generator circuit 24 has adder circuits 25 and 26 interposed between the demultiplexer 14 and the square summing circuit 15. By the these adder circuits 25 and 26, predetermined additional values VI and VQ are added to the I signal data DI and the Q signal data DQ respectively, thus making the signal levels of the I signal data DI and the Q signal data DQ to be offset. In this regard, the additional values VI and VQ are arranged to be freely set within the predetermined range aground zero level as a center by operating an operating element disposed on an operating panel of the editing system.

Figure 12:
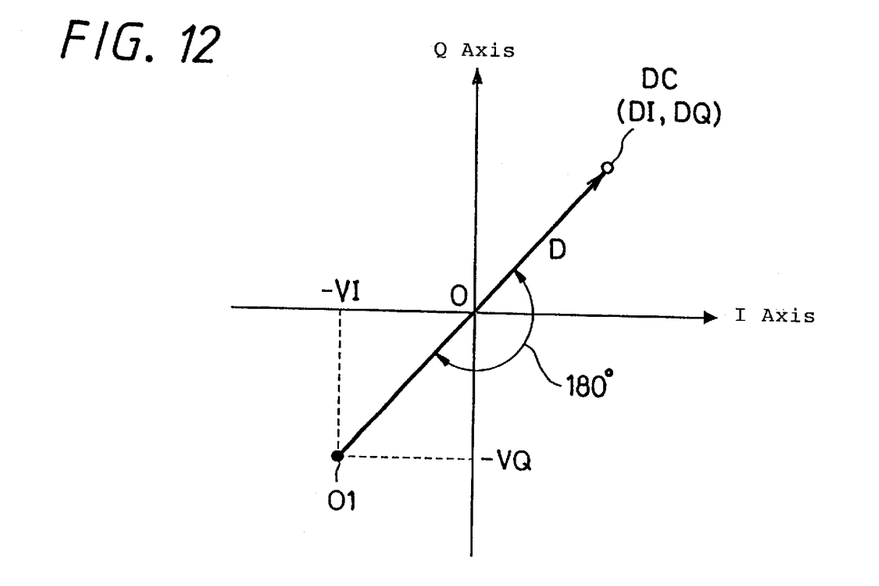
FIG. 12 is a characteristics curve diagram serving for explanation of setting a reference point when a picture of a signal color is to be processed.

Accordingly, as is shown in FIG. 12, the key signal generating circuit 24 makes these additional values VI and VQ variable so as to freely set a reference point 01 on a coordinates plane formed by the I axis and the Q axis, and is arranged to detect the scaler D of the digital chrominance signal DC with reference to the reference point 01 as a standard, namely, the distance D from the reference point 01.

Therefore, when generating the key signal with reference to the digital chrominance signal DC, in order to generate the key signal for different hues in the same way, setting the origin O as the reference point and detecting the distance D will allow the desired key signal to be generated, as described above on the first embodiment. In other words, if the hue of the picture to be processed varies depending on time or the like, it will be possible to produce the composed picture free of the incongruous sense by setting the origin O as the reference point.

In this case, for example, if it is desired to increase the key signal level of blue color forming an angle of about 180° with yellow color on the IQ plane relatively to the yellow color, namely, when the blue picture is composed in the thinner shape than the yellow picture, the desired key signal can be generated by shifting the reference point 01 to the yellow color side using the additional value VI and VQ. In addition, when the picture for which the key signal is to be generated is of a single color, by making the additional values VI and VQ variable and then setting the reference point 01 so that a straight line connecting the origin O to a position of the object to be processed on the IQ plane and a straight line connecting the reference point 01 to the origin O may form 180° as shown in FIG. 12, it is possible to detect the distance D whose value is greater as compared with the picture of other hue regarding this single color picture. In this way, concerning the single color picture, it is possible to generate the key signal having the signal level differing from other hue, which enables the single color picture to be composed without the sense of incongruity.

Figure 13:
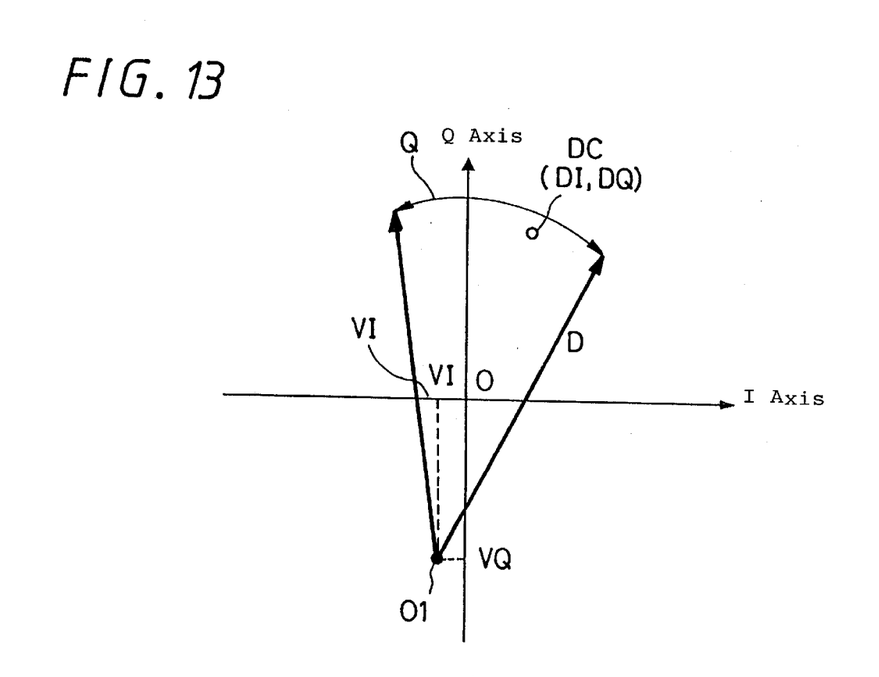
FIG. 13 is a characteristic curve diagram serving for explanation of setting a reference point when a picture having hues within a predetermined range is to be processed.

In contrast, as is shown in FIG. 13, when composing pictures of the hues within the range of a predetermined angle θ on the IQ plane, it is possible to generate the key signal by different signal level from that of the other hue picture regarding the picture within this range by making the additional value VI and VQ to be variable, which enables the picture within this range to be composed without causing the sense of incongruity.

According to the configuration shown in FIG. 11, by making the reference point 01 for detecting the distance to be freely changed, in addition to the advantageous effect of the first embodiment, it is possible to compose the image signal at further liberty and without giving the incongruous feeling and to create further effects which differ from those before.

(3) Other Embodiment

Having described, in the above embodiments, the case where the interpolating operation processing is performed by using the Lagrange's interpolation formula, the present invention is not to limited thereto and may widely utilize various interpolation operation means. Also, the number of samples used for the interpolating operation is not restrictive to four samples including previous and subsequent one, and can be selected to different numbers as the need arises.

Moreover, having described in the above embodiments the case where the scaler amount of the I signal and the Q signal is detected by the finding the square root of the square sum of the signal data and the Q signal data, the present invention is not limited thereto and may omit the square root finding processing or may change the multiplying value of the multiplier circuit 19 by that amount.

According to the present invention described above, by generating the key signal with reference to the signal level of the chrominance signal as a standard, it is possible to ensure the satisfactory picture processing even when processing the picture of little luminance signal component, thereby enable the image signals to be composed without causing the sense of incongruity.

What is claimed is:

1. An image signal processing apparatus characterized by comprising:
   a YC separator circuit for extracting a chrominance signal from an image signal;
   a signal level detector circuit for outputting a signal level detecting signal by detecting a signal level of said chrominance signal, said signal level detector circuit including an oversampler circuit;
   a signal level corrector circuit for correcting a signal level of said signal level detecting signal to generate a key signal according to said chrominance signal.

2. The image signal processing apparatus according to claim 1, characterized in that:
   said signal level detector circuit produces said signal level detecting signal by detecting a distance of an I signal and a Q signal forming said chrominance signal from a predetermined reference point on a coordinates plane formed by an I axis and a Q axis.

3. The image signal processing apparatus according to claim 2 characterized by comprising an adjuster circuit for making a position of said reference point to be variable.

4. The image signal processing apparatus according to claim 1, characterized in that:
   said signal level corrector circuit includes a clipper circuit for clipping said signal level detecting signal, and
   a multiplier circuit for weighting an output signal of said clipper circuit to output the key signal according to said digital chrominance signal.

5. The signal processing apparatus according to claim 1, characterized in that:
   said signal level corrector circuit includes
   a luminance signal processing circuit for generating a key signal according to a luminance signal with the luminance signal as a standard, and a key signal composer circuit for composing said key signal according to said luminance signal and said key signal according to said chrominance signal to output a composed key signal.

6. An image signal processing apparatus comprising:

a YC separator circuit for extracting a chrominance signal from an image signal, said image signal is formed by a digital signal c;

a signal level detector circuit for outputting a signal level detecting signal by detecting a signal level of said chrominance signal and said signal level detecter circuit produces a digital chrominance signal by extracting a chrominance, I and Q signal components from the digital signal, said digital chrominance signal being interpolating operation processed, thereby causing a sampling rate of the I signal component and the Q signal component to be corrected so that they are equal a sampling rate of a luminance signal, for detecting said signal level of said chrominance signal;

a signal level corrector circuit for correcting a signal level of said signal level detecting signal to generate a key signal according to said chrominance signal.

* * * * *